United States Patent
Keller et al.

(10) Patent No.: US 11,940,026 B2
(45) Date of Patent: Mar. 26, 2024

(54) BREMSSCHEIBE (BRAKE DISC)

(71) Applicant: SHW Brake Systems GmbH, Tuttlingen (DE)

(72) Inventors: Torben Keller, Tuttlingen (DE); Johann Schmitz, Tuttlingen (DE)

(73) Assignee: SHW Brake Systems GmbH (DE)

( * ) Notice: Subject to any disclaimer, the term of this patent is extended or adjusted under 35 U.S.C. 154(b) by 58 days.

(21) Appl. No.: 16/986,458

(22) Filed: Aug. 6, 2020

(65) Prior Publication Data
US 2021/0246955 A1    Aug. 12, 2021

(51) Int. Cl.
F16D 65/12    (2006.01)
F16D 65/02    (2006.01)

(52) U.S. Cl.
CPC .... F16D 65/128 (2013.01); *F16D 2065/1328* (2013.01); *F16D 2065/1392* (2013.01)

(58) Field of Classification Search
CPC ........................ F16D 65/12; F16D 65/123–128
USPC ........ 188/17, 18 A, 218 XL, 264 A, 264 AA
See application file for complete search history.

(56) References Cited

U.S. PATENT DOCUMENTS

| | | | |
|---|---|---|---|
| 8,651,248 B2 * | 2/2014 | Mueller | F16D 65/123 |
| | | | 188/218 XL |
| 2020/0217377 A1 * | 7/2020 | Milanesi | F16D 65/847 |
| 2021/0246955 A1 * | 8/2021 | Keller | B22D 19/04 |

FOREIGN PATENT DOCUMENTS

| | | | | |
|---|---|---|---|---|
| DE | 102006043945 A1 | * | 3/2008 | ........... F16D 65/123 |
| DE | 102008044339 A1 | * | 6/2010 | ........... F16D 65/123 |

* cited by examiner

*Primary Examiner* — Christopher P Schwartz
(74) *Attorney, Agent, or Firm* — Fitzpatrick PC

(57) ABSTRACT

A brake disk (1) has a brake disk chamber (2), a friction ring (3) having two friction ring disks (3a, 3b) and a plurality of pin-shaped connecting elements (4) for connecting the brake disk chamber (2) and the friction ring (3). A cooling duct (5) is formed between the fiction ring disks (3a, 3b). The friction ring disks (3a, 3b) have respective friction surfaces (3a1, 3b1) on their outer planar surfaces and respective cooling channel surfaces (3a2, 3b2) on their inner planar surfaces. The friction ring (3) has a plurality of receiving regions (7) for receiving the pin-shaped connecting elements (4). The brake disk chamber (2) is cast to the connecting elements (4) in a separate step by means of casting. A gap (8) existing between the brake disk chamber (2) and the friction ring (3) has such a width (A) which results from the fact that, during casting of the brake disk chamber (2), at least one section (3d) of a lateral surface (3c) of the inner diameter of the friction ring (3) which is closed in itself in the circumferential direction is used as part of a casting mold (9). An axial extension of that part of the receiving area (7) of the friction ring (3) which extends from the cooling channel surface (3a2) in the direction of the cooling channel (5) is 2-10 mm, preferably 4-7.5 mm, even more preferably 5.5 mm.

11 Claims, 4 Drawing Sheets

BREMSSCHEIBE (BRAKE DISC)

CROSS-REFERENCE TO RELATED APPLICATIONS

This application claims the benefit of DE patent application no. 102020103095.9 filed Feb. 6, 2020 entitled Brake Disc and EU patent application no. 20155955.6 filed Feb. 6, 2020 entitled Brake Disc, the entire contents of each which are incorporated by reference herein for all purposes.

FIELD OF THE INVENTION

The present invention relates to a brake disk having a brake disk chamber, a friction ring having two friction ring disks and a plurality of pin-shaped connecting elements for connecting the brake disk chamber and the friction ring.

BACKGROUND

DE 10 2010 024 389 A1 describes a connecting device between a friction ring and a brake disk chamber of a brake disk, wherein the friction ring is connected to the brake disk chamber via several connecting elements. The connecting elements, which are distributed over the circumference of the brake disk chamber and connected to it, project into recesses in a radially inner circumferential wall of the friction ring. The bores in the friction ring and the connecting elements are conical.

DE 10 2006 043 945 A1 describes a ventilated brake disk with a friction ring and a brake disk chamber which is connected to the friction ring by means of several connecting elements arranged around the circumference of the friction ring and running in a radial direction. The central axes of the connecting elements are offset from the center of the friction ring in the axial direction of the latter.

DE 10 2008 044 339 B4 describes a brake disk assembly for disk brakes having a friction ring, a connecting adapter for connecting the brake disk assembly to a wheel hub and several connecting elements for connecting the friction ring to the connecting adapter. The connection adapter has a fastening area in which the connecting element is fixed and which is designed as a recess extending from the outer circumference of the connection adapter in a radial direction into the latter. Furthermore, the connection adapter has a radial recess for the circulation of air, which extends from the inner circumference of the connection adapter to its fastening area for the connecting element. The friction ring has a receiving area in which the connecting element is received in such a way that the friction ring is radially movable in relation to the connecting element.

DE 10 2013 215 997 A1 describes a brake disk for a disk brake with a brake disk chamber and a friction ring connected to it via connecting means. A shell of the brake disk chamber is provided with sections of reduced wall thickness and/or openings, which are designed as axially directed material recesses located on the outer circumference of the brake disk chamber shell, which serve to position the connecting means as close as possible to the brake disk chamber shell.

A further brake disk is described in DE 10 2009 021 852 A1. It has a brake disk chamber and a friction ring which are connected to each other by means of pin-shaped connecting elements. The connecting elements are inserted into an axially running through opening of the brake disk chamber.

Another brake disk having two friction rings and a disk chamber connected to the friction rings by connecting elements is known from DE 10 2009 002 690 A1. Between the two friction rings there is a support web which has recesses.

In addition, DE 10 2013 002 300 B3 describes a connecting element which has recesses and/or projections at both end areas, i.e. at the end area accommodated in the brake disk chamber and at the end area accommodated in the friction ring. In this way, the connecting elements can be cast with a form fit to the brake disk chamber or the friction ring.

DE 101 03 639 A1 describes connecting elements designed as hollow pins which are intended to improve cooling of the friction ring.

A brake disk having a friction ring and a brake disk chamber, which are connected by means of such connecting elements, is also described in DE 198 43 399 A1. One wall of the brake disk chamber is designed to be flexible in the radial direction.

Further connecting elements which are manufactured integrally and in one piece with the friction ring and are wedge-shaped on the side accommodated in the friction ring are described in EP 2 275 702 B1.

EP 1 122 456 A1 describes connecting elements which are provided with several annular grooves on their end areas which are firmly cast into the friction ring.

GB 1 032 923 describes a brake disk whose friction ring is cast onto the guide surfaces of a hub member in such a way that a radial movement of the friction ring relative to the brake disk chamber is possible in the event of an increase in temperature and the associated enlargement of the friction ring.

From DE 199 18 667 A1 describes a brake disk for a disk brake of a vehicle which is known, which has a cup section and a friction ring section with two friction rings connected by webs. The cup and friction ring sections interlock in such a way that there is a form fit in the axial and the circumferential direction and limited displacement in the radial direction.

In U.S. Pat. No. 5,862,892 A describes a composite rotor for caliper disk brakes is described which includes an outer friction portion having two ring sections, an inner hub portion having a central mounting section, and a peripheral section which is cast into a cavity of the outer friction portion.

All the known internally ventilated brake disks have in common that an air flow necessary for cooling the friction ring, which is led from the inside of the vehicle to the opening of the brake disk chamber and thus into the cooling channel of the brake disk, can only be led through the cooling channel of the friction ring to a limited extent. One reason for this is the comparatively large slot between the brake disk chamber and the friction ring, which makes it possible for some of the air flowing through the brake disk from the inside to the outside to flow out through this slot and thus cannot flow through the cooling channel of the friction ring. On the other hand, there are various elements or areas in the connecting area between the brake disk chamber and the friction ring that obstruct the flow, which are, however, necessary in particular because the friction ring is connected to the brake disk chamber via the connecting elements. Due to their large diameter, as in DE 10 2008 044 339 B4, or a shoulder area with a large diameter, as in DE 10 2016 122 321 A1, the pin-shaped connecting elements require a particularly large amount of space, which not only obstructs the flow of cooling air, but also limits the design possibilities of the receiving areas used to accommodate the pin-shaped connecting elements.

Furthermore, the connecting elements also contribute to a considerable extent to the mass of the entire brake disk.

SUMMARY OF INVENTION

It is therefore the object of the present invention to create a brake disk having a brake disk chamber, a friction ring comprising two friction ring disks and a cooling channel formed between them, and several pin-shaped connecting elements for connecting the brake disk chamber with the friction ring, which allows a better flow of cooling air through the brake disk and in particular the friction ring.

According to the invention, this object is solved by the features mentioned in claim 1.

A gap between the brake disk chamber and the friction ring resulting from the use of at least one circumferentially closed section of a lateral surface of the inner diameter of the friction ring as part of a casting mold during the casting of the brake disk chamber and the shrinkage of the material of the brake disk chamber during solidification has a much smaller width than is the case with conventional composite brake disks. As a result, much less cooling air can escape through this gap, which leads to an increased cooling air flow through the cooling channel of the friction ring and thus to a better cooling of the friction ring. In the end, this results in lower temperatures of the friction ring, which enables the brake disk to provide a much better braking performance.

Due to the smaller gap between the outer diameter of the brake disk chamber and the inner diameter of the friction ring, the free length of the pin-shaped connecting elements or pins is shortened and thus the stresses acting on the connecting elements are significantly reduced. The solution according to the invention also allows a reduction in the size of the pins, which makes it possible to make the receiving area of the friction ring for the pins considerably smaller and thus to widen the cooling channel for a better flow of cooling air.

Moreover, the solution according to the invention, thanks to the resulting better cooling, allows a reduction of the thermal mass of the brake disk, which in turn allows the reduction of the total mass of the brake disk. A fundamental advantage of such a composite brake disk, which has pin-shaped connecting elements to connect the brake disk chamber and the friction ring, is that weight is saved by eliminating material doubling on the friction ring. A further advantage of the solution according to the invention is that the inner diameter of the friction ring can be reduced and/or the outer diameter of the brake disk chamber can be increased, which leads to an improved freedom of design in the layout of such a brake disk According to the invention, it is further provided that an axial extension of that part of the receiving area of the friction ring which extends from the cooling channel surface in the direction of the cooling channel is 2-10 mm, preferably 4-7.5 mm, even more preferably 5.5 mm. This very small expansion of the receiving areas in the axial direction results in a larger opening in the cooling channel, so that more cooling air can flow into it and the cooling of the brake disk according to the invention is further improved.

An embodiment of the invention which is particularly relevant in practice may be that the gap has a width of 0.1-1.5 mm, preferably 0.5-1.0 mm, even more preferably mm. Such gap widths can be achieved in particular by using at least a portion of the inner diameter surface of the friction ring as part of a casting mold when casting the brake disk chamber. Due to the small gap widths mentioned above, the loss of cooling air through the gap is considerably reduced, which significantly increases the flow of cooling air through the cooling channel of the friction ring and thus improves the cooling of the ring.

In a further advantageous embodiment of the invention, it may be provided that 21-42, preferably 27-32, connecting elements are provided for connecting the brake disk chamber and the friction ring.

A further advantageous embodiment of the invention may be that the connecting elements have a diameter of 3-6.5 mm, preferably 4-5.5 mm, even more preferably 5 mm. Depending on the number of connecting elements, it is possible, as briefly mentioned above, to substantially reduce the diameter of the same without a loss of strength, which leads to the above-mentioned advantages with regard to a reduction of the brake disk chamber and the receiving areas of the friction ring for the connecting elements.

If, in a further advantageous embodiment of the invention, the connecting elements each have a length of 20-30 mm, preferably 22-26 mm, the receiving areas for the connecting elements can be reduced both in the friction ring and in the brake disk chamber, whereby a further improvement of the flow through the friction ring can be achieved.

Furthermore, it may be provided that the connecting elements are conical and have a cone angle of $0.6°$-$3.6°$, preferably $1.6°$-$2.6°$. The use of conical connecting elements with the aforementioned cone angle leads to lower frictional forces between the connecting elements and the friction ring, which results in good sliding of the connecting elements within the friction ring and thus to a reduction of the thermo-mechanical stresses in this area.

An alternative solution to the problem is given in claim 7.

Such a high number of preferably pin-shaped connecting elements, which connect the brake disk chamber with the friction ring, makes it possible to use considerably smaller connecting elements than is the case with conventional brake disks in order to achieve the same strength of connection between the brake disk chamber and the friction ring. This also allows a considerable reduction in the areas in the friction ring and in particular in the brake disk chamber which accommodate the connecting elements, thus making it possible to make the friction ring and in particular the brake disk chamber slimer or narrower than before in the area through which the fluid flows. This means that the air flow in this area is much less obstructed, which ensures a better flow through this area and thus a higher volume flow through the friction ring and better cooling of the same. The reduction in the material of the brake disk chamber and the friction ring in this area also results in material savings, which contribute to a reduction in weight and costs of the entire brake disk.

The possible reduction in the size of the connecting elements and the correspondingly smaller area of the friction ring for the connecting elements also results in a lower introduction of stresses due to lower changes in stiffness, which leads to an increase in the strength, service life and safety of the entire brake disk. In addition, the aforementioned reduction of the receiving area and the resulting lower material accumulation also allows for better castability of the brake disk chamber and the friction ring. Furthermore, due to the reduced receiving area of the friction ring for the connecting elements, a more homogeneous mass distribution is achieved, which leads to smaller temperature gradients and thus to lower thermo-mechanical stresses and reduced thermal fatigue and crack formation, which also increases the strength, the service life and thus the safety of the brake disk. In addition, the more homogeneous distribution of masses allows improved rubbing and thus comfort behavior to be achieved.

A further alternative solution to the problem is given in claim 8.

Such a considerable reduction of the diameter of the preferably pin-shaped connecting elements connecting the brake disk chamber with the friction ring compared to known solutions allows a reduction of the brake disk chamber and the area of the friction ring for the connecting elements, which results in an improved flow of cooling air through the friction ring. In addition, connecting elements having a smaller diameter allow for a more off-center connection to the friction ring, which also improves the flow of cooling air through the friction ring. Due to the smaller contact surface resulting from the smaller diameter and possibly also the shorter length of the connecting elements, there are also lower frictional forces between the connecting elements and the friction ring.

A further alternative solution to the problem is given in claim 9.

By reducing the length of the connecting elements to 20-30 mm, preferably 22-26 mm, the connection areas of the preferably pin-shaped connecting elements in both the friction ring and the brake disk chamber can be considerably reduced compared to previous solutions, which results in a further improvement of the flow through the cooling channels of the friction ring. Furthermore, such a solution also leads to lower costs for the individual connecting elements, which reduces the costs of the entire brake disk.

Another alternative solution to the problem is given in claim 10.

The use of conical, preferably pin-shaped connecting elements with the cone angle mentioned above results in lower friction forces between the connecting elements and the friction ring, which leads to a good smoothness of the connecting elements within the friction ring and thus to a reduction of the thermomechanical stresses in this area. The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

BRIEF DESCRIPTION OF THE PRESENT INVENTION

DETAILED DESCRIPTION OF THE PREFERRED EMBODIMENTS

Figure 1:
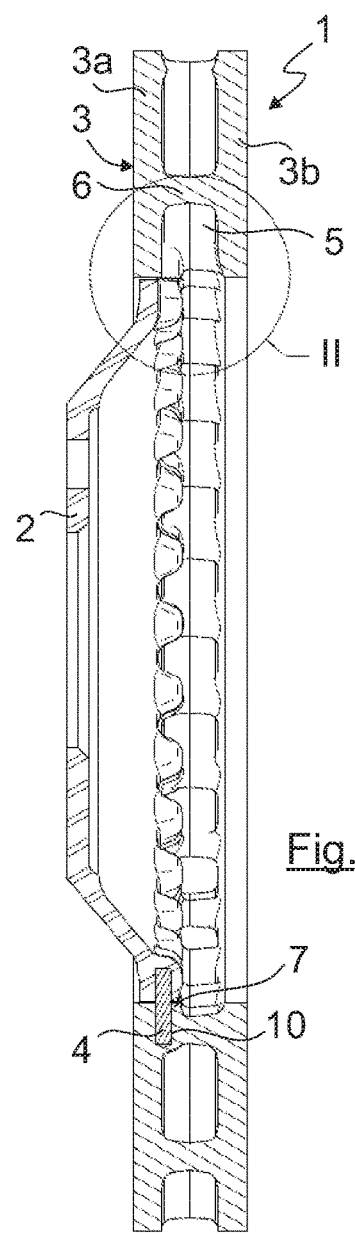
FIG. 1 is a sectional view of a first embodiment of a brake disk according to the invention.

FIG. 1 shows an internally ventilated brake disk 1 designed as a composite brake disk and having been optimized for cooling as described below, which has, in a manner known to the expert, a brake disk chamber 2, around the circumference of which a breaking band or friction ring 3 is placed. The friction ring 3 has two friction ring disks 3a and 3b and is connected to the brake disk chamber 2 by means of several pin-shaped connecting elements 4 extending in a radial direction from the brake disk chamber 2 to the friction ring 3. The friction ring 3 is mounted in a gliding or sliding way on the pin-shaped connecting elements 4, which means that it can expand freely and unhindered in the radial direction during thermal loading of the brake disk 1 and is therefore less susceptible to crack formation.

Figure 2:
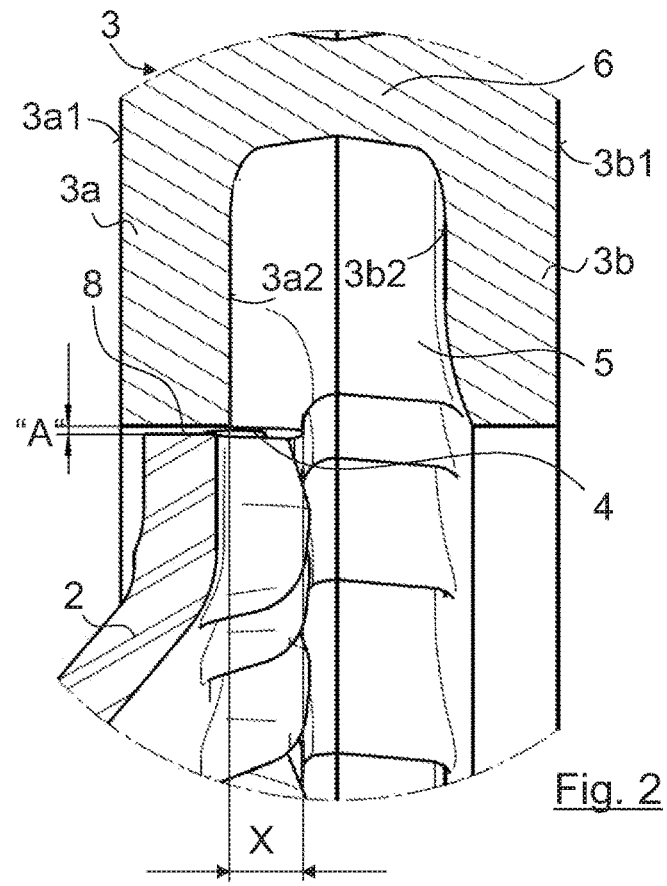
FIG. 2 is an enlarged representation according to line II of FIG. 1.

On their outer end faces, the friction ring disks 3a and 3b have respective friction surfaces 3a1 and 3b1, which are only shown in FIG. 2 for the sake of clarity. A cooling channel 5 is formed between the friction ring disks 3a and 3b through which cooling air can flow outwards through the friction ring 3 from the direction of the brake disk chamber 2 during operation of the brake disk 1 in a known manner. On their inner end faces, the friction ring disks 3a and 3b have respective cooling channel surfaces 3a2 and 3b2, which are also only marked in FIG. 2. The cooling channel surfaces 3a2 and 3b2 are thus opposite the friction surfaces 3a1 and 3b1. Within the cooling channel 5, there are several connecting webs 6, which connect the friction ring disks 3a and 3b to each other in a known manner. Furthermore, the friction ring 3 has several receiving areas 7 for receiving the pin-shaped connecting elements 4. These will be described in more detail later.

In a known manner, the brake disk chamber 2 forms the connection of the brake disk 1 to a not shown chassis of a vehicle equipped with brake disk 1. In addition, brake pads not shown in the figures are applied to the friction ring 3 in a similarly known manner to achieve the desired deceleration of the vehicle. The connecting elements 4 transmit the braking torque acting on the friction ring 3 to the brake disk chamber 2 and thus to the vehicle. The connecting elements 4 are thus exposed to very high loads and it is essential for the effect of the brake disk that the connecting elements 4 remain intact.

One of the connecting elements 4 is shown in FIG. 1 in a sectional view. It can be seen that the connecting element 4 used to connect the brake disk chamber 2 with the friction ring 3 in the embodiment of FIGS. 1-7 of the brake disk 1 is essentially cylindrical. This makes it possible to use standard parts or components that are only slightly modified from standard parts, such as dowel pins, as the connecting elements 4. In the embodiment of the brake disk 1 shown in FIGS. 1-7, the connecting elements 4 have a diameter of 3-6.5 mm, preferably 4-5.5 mm, even more preferably 5 mm. The length of the connecting elements 4 for the embodiment of the brake disk 1 shown in FIGS. 1-7 is 20-30 mm, preferably 22-26 mm. The diameter and the length of the connecting elements 4 can be in a certain ratio to each other, in principle, however, both the diameter and the length can be freely selected in the areas mentioned.

There is a gap 8 between the brake disk chamber 2 and the friction ring 3, which is comparatively large for conventional brake disks, such as the brake disk described in DE 10 2016 122 321 A1. FIG. 2 of DE 10 2016 122 321 A1 shows the size of this gap between the brake disk chamber and the friction ring. Such a large gap, which is common for all known composite brake disks, allows much of the cooling air necessary for cooling the friction ring 3, through which air can flow as described above, to flow out or to disperse, which can lead to excessive heating of friction ring 3.

In contrast, the gap 8 between the brake disk chamber 2 and the friction ring 3 of the brake disk 1 according to the invention has a width of 0.1-1.5 mm, preferably 0.5-1.0 mm, and even more preferably 0.7 mm, i.e. a much smaller width than usual. As a result, less air can flow out through the gap 8 and more air enters the cooling chamber 5 between the friction ring disks 3a and 3b of friction ring 3, thus leading to a better cooling of the friction ring 3.

Figure 3:
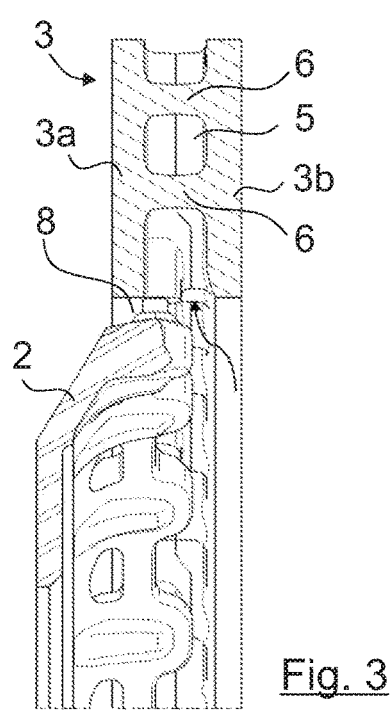
FIG. 3 is a sectional view of a brake disk known from the state of the art.
Figure 4:
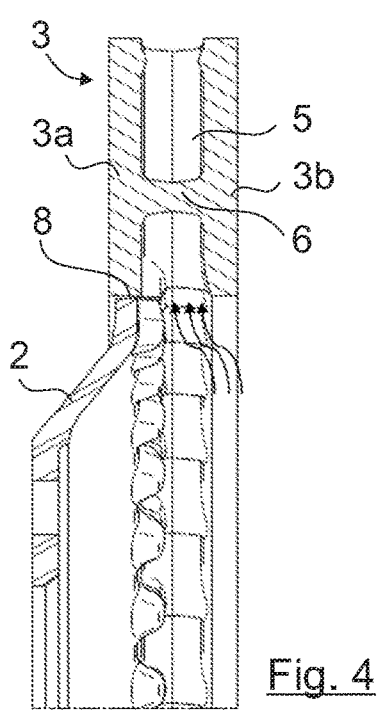
FIG. 4 shows the brake disk according to the invention in a view corresponding to FIG. 3.

A comparison of FIGS. 3 and 4 clearly shows the difference between the brake disk shown in FIG. 3 according to DE 10 2016 122 321 A1 and the brake disk 1 according to the invention. While the brake disk shown in FIG. 3 allows a great amount of cooling air to flow out through the very large gap 8 of the brake disk according to the state of the art, this is prevented by the very small gap 8 of the brake disk 1 according to the invention. The cooling air flow is shown in FIGS. 3 and 4 by means of arrows. The larger number of arrows in FIG. 4 shows that much more cooling air can flow through the cooling channel between the friction ring disks 3a and 3b of the friction ring 3 of the brake disk 1 according to DE 10 2016 122 321 A1 than through the cooling channel 5 between the friction ring disks of the friction ring of the brake disk according to DE 10 2016 122 321 A1. This results in considerably better cooling of the friction ring 3 of the brake disk 1 according to the invention.

Figure 5:
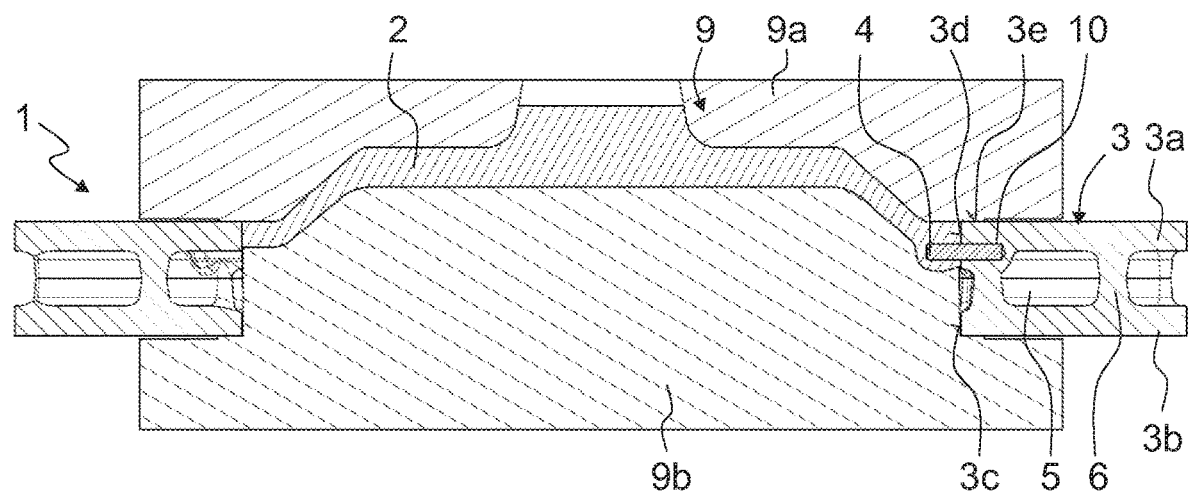
FIG. 5 is a sectional view of a tool for manufacturing the brake disk according to the invention.
Figure 6:
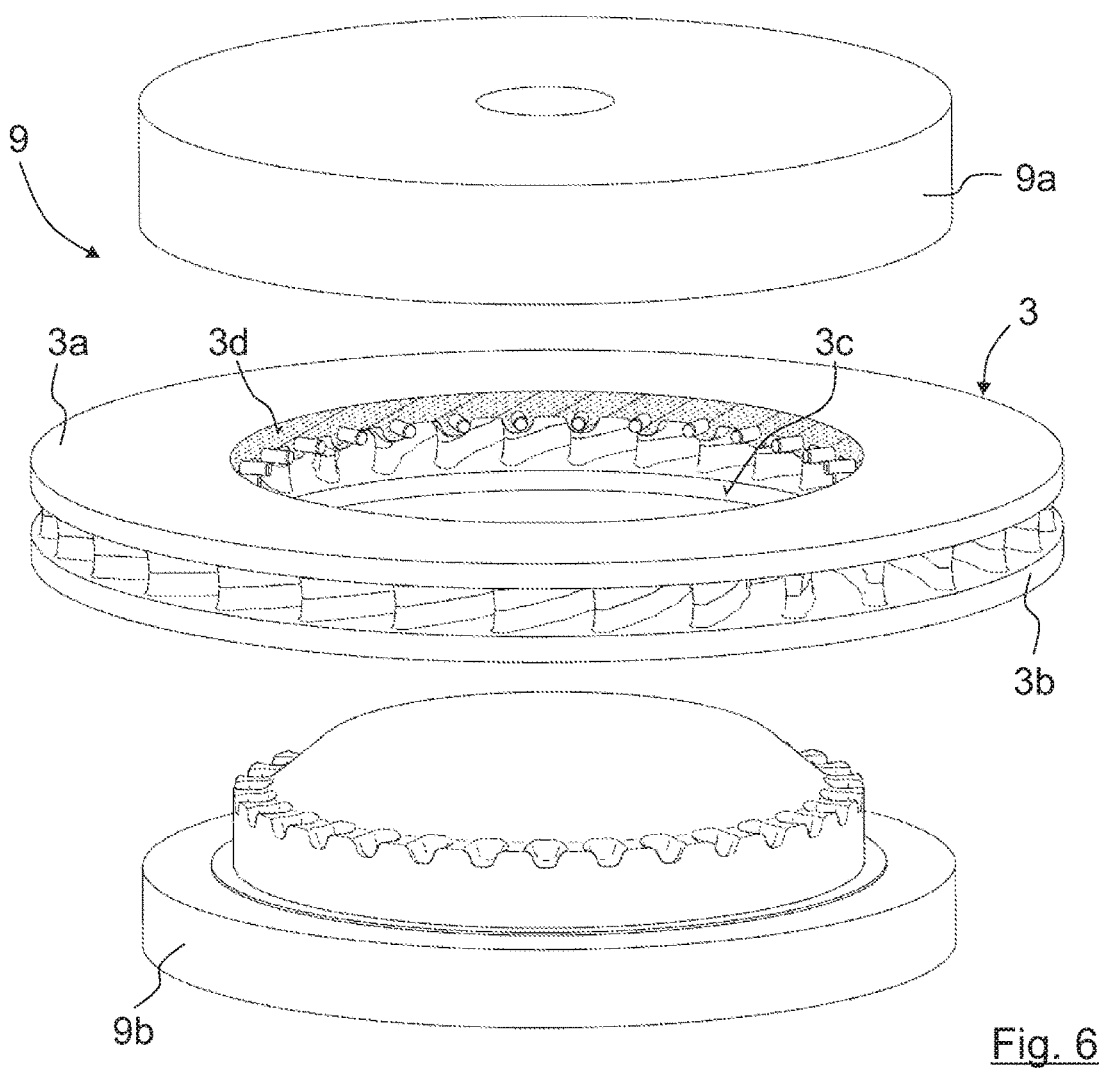
FIG. 6 is another view of the tool for manufacturing the brake disk according to the invention.

The width A of the gap 8 results from the fact that during casting of the brake disk chamber 2 at least a section 3d of a circumferentially closed surface 3c of the inner diameter of the friction ring 3 is used as part of a casting mold 9 used for casting the brake disk chamber 2. The mold 9, which is formed by an upper mold part 9a, a lower mold part 9b and the friction ring 3, is shown in FIGS. 5 and 6. The upper part of the casting mold 9a closes the cavity of the casting mold 9, which is to be filled with melt, by resting on a flat surface or end face 3e of the friction ring 3, in this case the friction ring disk 3a, which is shown the upper friction ring in the illustration. Accordingly, the brake disk chamber 2 is cast onto the connecting elements 4 in a separate casting step.

The brake disk chamber 2 is produced by means of gravity die casting in a known manner, in which, as mentioned above, in contrast to known solutions, the friction ring 3 or a section 3d of the surface 3c of the inner diameter of the friction ring 3 is used as part of the casting mold 9. During the casting process, the gap 8 is created by the shrinkage of the material used for casting the brake disk chamber 2, preferably an aluminum material.

FIG. 6 shows a perspective view of the casting mold 9, in which it is clearly visible what is meant by the section 3d of the circumferential surface 3c of the inner diameter of the friction ring 3, which is closed in itself in the circumferential direction and forms part of the casting mold 9, namely that it only takes up a part of the axial extension of the circumferential surface 3c of the inner diameter of the friction ring 3. In FIG. 6, in which the friction ring 3 is shown in a lying manner, this corresponds to a part of the height of the surface area 3c of the inner diameter of the friction ring 3. The section 3d in FIG. 6 is marked by a point hatching and it can be seen that in the present case only the upper friction ring disk 3a forms a part of the casting mold. For example, the section 3d of the surface area 3c of the inner diameter of friction ring 3 may have an axial expansion of 3-20 mm, preferably 5.5-10 mm.

In a process for manufacturing the brake disk 1, at least a section 3d of the lateral surface 3c of the inner diameter of the friction ring 3 is therefore used as part of the casting mold 9 during casting of the brake disk chamber 3. Furthermore, this process may also provide for the friction ring 3, which is preferably made of grey cast iron, to be heated before casting. The heating causes the friction ring 3 to expand, which leads to a further reduction of the gap 8 as the friction ring 3 contracts again during subsequent cooling.

To accommodate the connecting elements 4, the friction ring 3 has the respective receiving areas 7 already mentioned above, each of which is provided with bores 10 into which the connecting elements 4 are inserted before casting the brake disk chamber 2. The bores 10 can be designed as blind bores, i.e. they can be designed so that they do not open into one of the cooling channels of the friction ring 3. Such a solution, which prevents water from entering bores 10 and the resulting corrosion problems, can be independent of the other embodiments of the brake disk 1 described herein.

The connecting elements 4 can, for example, be fastened in the bores 10, which are designed as blind bores, by cooling them down before mounting. In this case, it is also possible to use connecting elements 4 which are slightly flattened on one side so that air can escape when inserting the connecting elements 4 into the bores 10.

The areas of the brake disk chamber 2 in which it is cast onto the connecting elements 4 are designed as small as possible and as large as necessary to absorb the forces introduced into the brake disk chamber 2 via the friction ring 3 and the connecting elements 4. Due to the described reduction in the size of the connecting elements 4, however, these areas can be designed smaller than with known solutions. The cylindrical shape of the connecting elements 4 described above having no outwardly protruding shoulders or the like allows a further reduction of the areas in which the brake disk chamber 2 is cast around the connecting elements 4.

Figure 7:
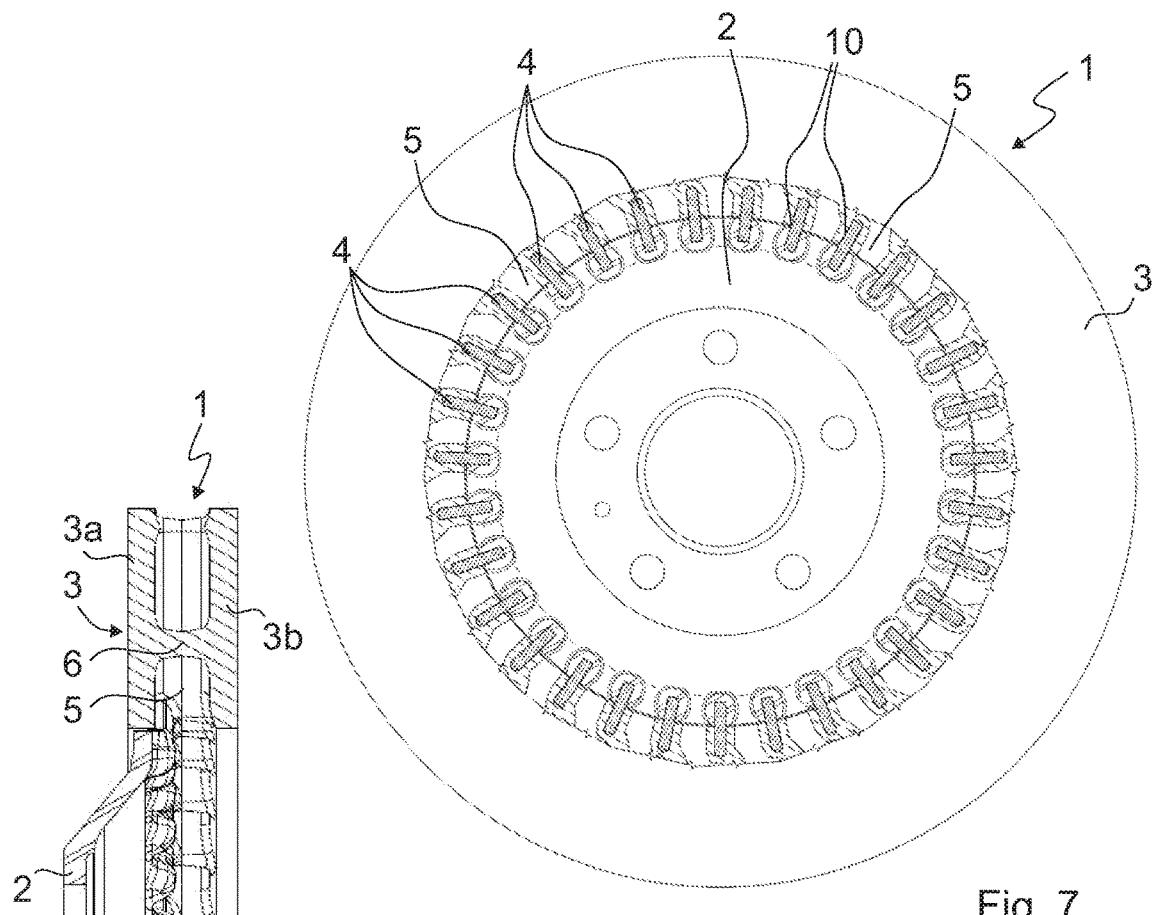
FIG. 7 is a partially cut front view of the brake disk according to FIGS. 1, 2 and 4.

FIG. 7 shows a front view of the brake disk 1. It can be seen that it has a considerably larger number of connecting elements 4 than known brake disks. In particular, the number of connecting elements 4 is 21-42, preferably 27-32. In this concrete embodiment, 31 connecting elements 4 are provided. This high number of connecting elements 4 enables the greatly reduced dimensioning of the connecting elements 4 with regard to their diameter and length as described above.

Figure 8:
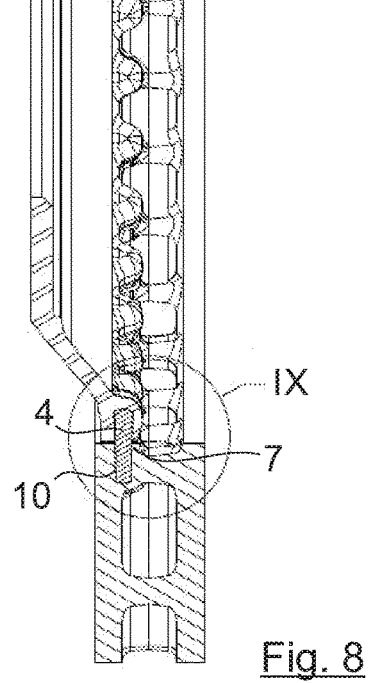
FIG. 8 is a sectional view of a second embodiment of a brake disk according to the invention.
Figure 9:
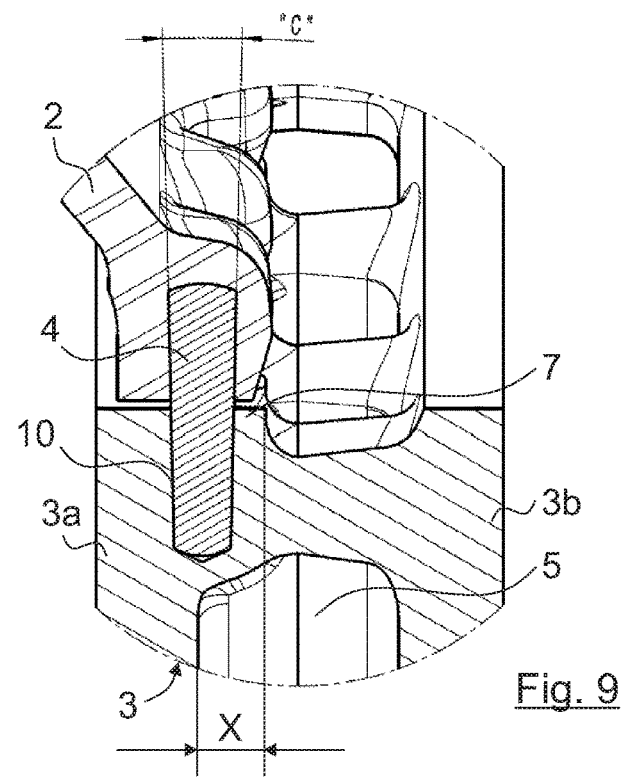
FIG. 9 is an enlarged view according to line IX of FIG. 8.

FIGS. 8 and 9 show another embodiment of the brake disk 1, which also has the brake disk chamber 2, the friction ring 3 and the connecting elements 4 for connecting the brake disk chamber 2 and the friction ring 3.

In contrast to the embodiment shown in FIGS. 1-7, however, the connecting elements 4 are conical in shape and have a cone angle of 1.6°-3.6°, preferably 1.6°-2.6°, designated "C" in FIG. 9. In this case, the smaller diameter of the connecting elements 4 is located inside the friction ring 3, i.e. the diameter of the connecting elements 4 decreases in the direction from the brake disk chamber 2 towards the friction ring 3, so that an expansion of the friction ring 3 due to heating is possible.

The conicity of the connecting elements 4 also prevents them from being pulled out of the brake disk chamber 2 when the friction ring 3 expands, as the friction ring 3 can become detached from the connecting elements 4. The connecting elements 4 are preferably conical over their entire length.

The diameter and length of the connecting elements 4 can correspond to the values described above with regard to the connecting elements 4 of the brake disk 1 according to FIGS. 1-7. The bores 10 of the friction ring 3 of brake disk 1 as shown in FIGS. 8 and 9 can also be blind bores. In the case of the conical connecting elements 4, they can be fitted very easily into the blind bores 10, since the air in the bores 10 can then escape without any problems.

Figure 10:
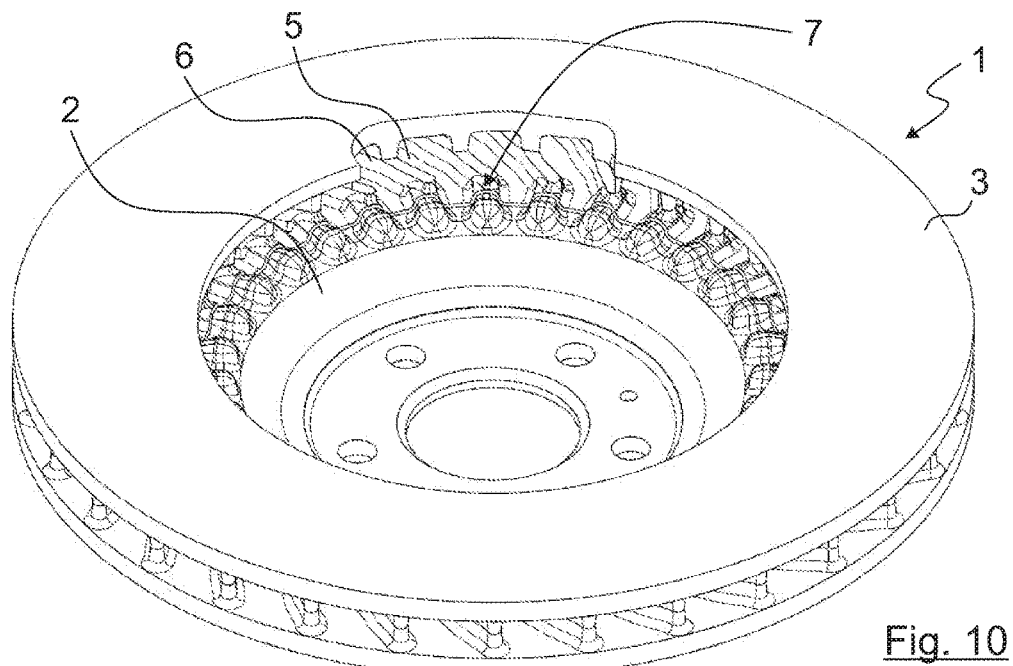
FIG. 10 is a partially cut perspective view of the brake disk according to the invention.
Figure 11:
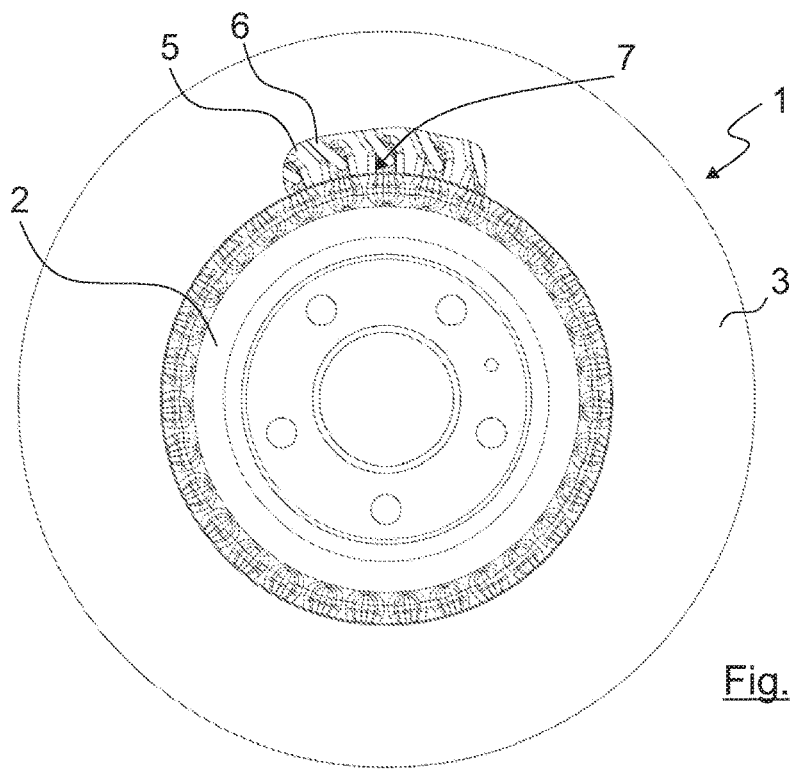
FIG. 11 is a partially cut front view of the brake disk according to FIG. 10.

FIGS. 10 and 11 show further illustrations of the brake disk 1, from which the configuration of the brake disk 1 is more clearly shown, particularly in the receiving areas 7 for the connecting elements 4.

Figure 12:
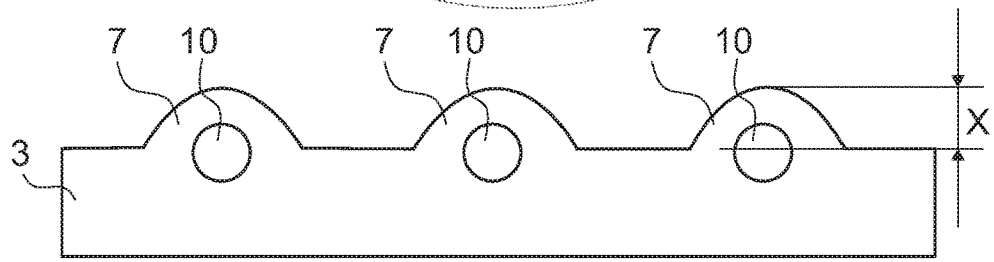
FIG. 12 shows a section of the developed view of the inner diameter of the friction ring of a brake disk according to the invention, showing the axial extension "X" of the area of the friction ring for the connecting elements.

FIG. 12 shows a very schematic representation of a section of a developed view of the inner diameter of the friction ring of a brake disk according to the invention with the receiving areas 7 of the friction ring 3 for the connecting elements 4. An axial extension of that part of the receiving area 7 of the friction ring 3 which runs from the cooling channel surface 3a2 of the friction ring disk 3a in the direction of the cooling channel 5 is marked "X". Accordingly, the relevant part of the receiving area 7 for this axial extension "X" is defined as the area of the friction ring 3 that begins at the cooling channel surface 3a2 of the friction ring disk 3a in which the bore 10 for locating the connecting element 4 is located and where the friction ring disk 3a ends or where the connecting web 6 begins. In the present case, this axial extension X is 2-10 mm, preferably 4-7.5 mm, even more preferably 5.5 mm. In FIGS. 2 and 9 the axial extension X of the receiving areas 7 of the friction ring 3, starting from the cooling channel surface 3a2 of the friction ring 3a in the direction of the cooling channel 5, is also indicated. This axial extension X of the receiving areas 7 is comparatively small, which results in an enlarged opening in the cooling channel 5 and allows more cooling air to flow into the same.

In principle, all the embodiments of the brake disk 1 described herein can be combined with each other in any way, unless there are obvious reasons for not combining them. In particular, it is possible to realize one or more of the features, according to which 21-42, preferably 27-32, connecting elements 4 are provided for connecting the brake disk chamber 2 with the friction ring 3, according to which the connecting elements 4 have a diameter of 3-6.5 mm, preferably 4-5.5 mm, more preferably 5 mm, according to which the connecting elements 4 each have a length of 20-30 mm, preferably 22-26 mm, and/or according to which the connecting elements 4 are conical and have a cone angle of 0.6°-3.6°, preferably 1.6°-2.6°, in a single brake disk 1.

The invention claimed is:
1. A brake disk comprising:
a brake disk chamber;
a friction ring having two friction ring disks;
a plurality of pin-shaped connecting elements configured to connect the brake disk chamber and the friction ring;
a cooling duct being formed between the fiction ring disks, wherein the friction ring disks comprise respective friction surfaces on their outer planar surfaces and respective cooling channel surfaces on their inner planar surfaces, wherein the friction ring comprises a plurality of receiving regions for receiving the pin-shaped connecting elements, and the brake disk chamber is cast to the connecting elements during casting;
wherein a width of a gap existing between the brake disk chamber and the friction ring resulting from the fact that, during casting of the brake disk chamber, at least one section of a lateral surface of the inner diameter of the friction ring comprises a circumferentially closed section due to a material of the brake disc chamber shrinking during solidification, wherein the circumferentially closed section is used as part of a casting mold, wherein the gap has a width of 0.1 to 1.5 mm, wherein an axial extension of that part of the receiving area of the friction ring which extends from the cooling channel surface in the direction of the cooling channel is 4.0 to 7.5 mm, wherein the connecting elements are essentially cylindrical, without outwardly protruding shoulders, or are conical and have a cone angle of 0.6° to 3.6°, and wherein the connecting elements have a diameter of 3.0 to 6.5 mm.
2. The brake disk according to claim 1, wherein the gap has a width of 0.57 to 1.0 mm.
3. The brake disk according to claim 1, wherein 21 to 42, connecting elements are provided to connect the brake disk chamber and the friction ring.
4. The brake disk according to claim 1, wherein the connecting elements have a diameter of 4.0 to 5.5 mm.
5. The brake disk according to claim 1, wherein the connecting elements each have a length of 20-30 mm.
6. The brake disc of claim 1, wherein the cooling channel surface in the direction of the cooling channel is 5.5 mm.
7. The brake disc of claim 1, wherein the connecting elements have a cone angle of 0.6° to 3.6°, preferably 1.6° to 2.6°.
8. The brake disc of claim 1, wherein the gap has a width of is 0.7 mm.
9. The brake disk according to claim 1, wherein 27 to 32 connecting elements are provided to connect the brake disk chamber and the friction ring.
10. The brake disk according to claim 1, wherein the connecting elements have a diameter of 5 mm.
11. The brake disk according to claim 1, wherein the connecting elements each have a length of 22 to 26 mm.

* * * * *